July 23, 1968  G. L. CHENEY  3,394,390

METHOD FOR MAKING COMPOUND SEMICONDUCTOR MATERIALS

Filed March 31, 1965

Gerald L. Cheney
INVENTOR.

BY

ATTORNEY

United States Patent Office 3,394,390
Patented July 23, 1968

3,394,390
METHOD FOR MAKING COMPOUND SEMICONDUCTOR MATERIALS
Gerald L. Cheney, Dallas, Tex., assignor to Texas Instruments Incorporated, Dallas, Tex., a corporation of Delaware
Filed Mar. 31, 1965, Ser. No. 444,282
9 Claims. (Cl. 23—204)

ABSTRACT OF THE DISCLOSURE

The specification discloses a method of forming epitaxial deposits of Group III–V compound semiconductor materials characterized by reacting in the vapor phase a thermally decomposed product of a volatile hydride of a Group V element with a disproportionation product of an unstable halide of a Group III element. The high temperature stable halide disproportionates to the element and a low temperature stable halide upon passing through a decreasing temperature gradient. The free Group III and Group V elements then react to form a deposit of the compound semiconductor material at the surface of the substrate. Specific examples are provided of compounds of both the Group III and the Group V elements for use in the invention.

---

Figure 1:
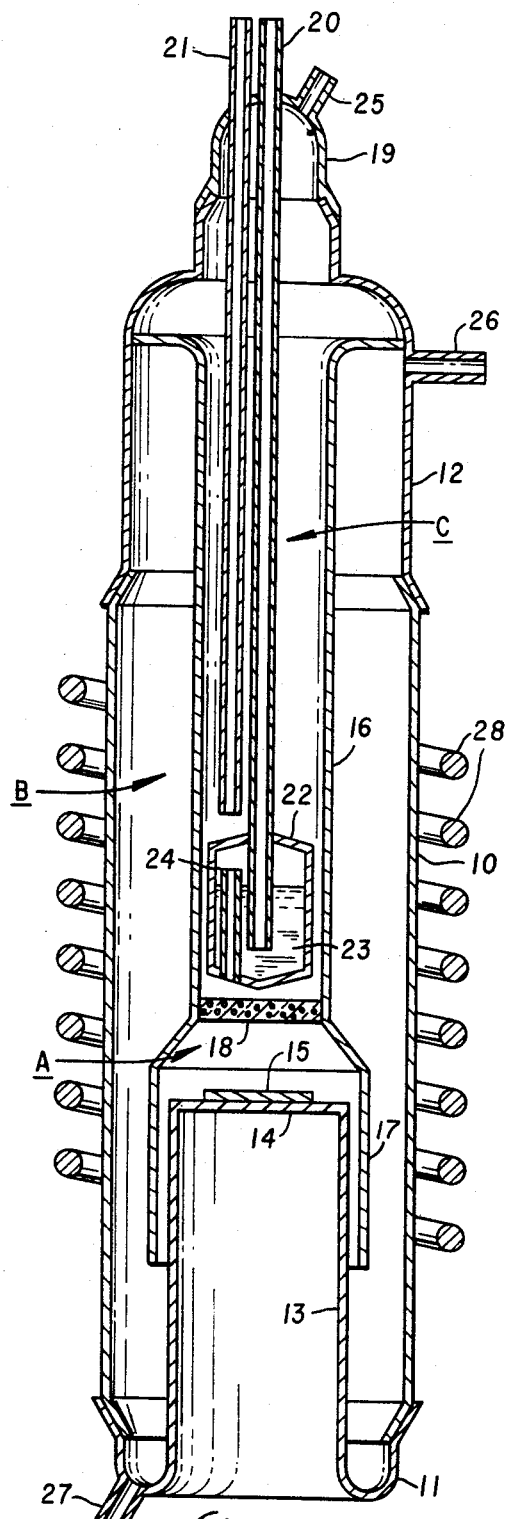

This invention relates to the production of compound semiconductor materials, particularly the Group III–V compounds, by the vapor phase reaction of the product of a thermal decomposition of a volatile hydride of one constituent with the product of a halogen disproportionation of the other constituent.

Several methods for the vapor phase production of Group III–V compound semiconductors have become known in the art. Typical of these is the reaction of a Group V element halide with a Group III element halide in a decreasing temperature gradient reactor to produce the Group III–V compound. Vapor phase production of Group III–V compounds by this method is described in U.S. Patent No. 3,094,388, to R. E. Johnson et al.

A common characteristic of conventional techniques for the vapor phase production of Group III–V compound semiconductors is the use of hydrogen and a halide of the Group V element. Consequently, relatively large quantities of hydrogen chloride (HCl) are produced as a by-product of the reaction. Since the deposition of the epitaxial material takes place at an elevated temperature, the high temperature HCl gas tends to etch the substrate during the deposition process, thereby retarding the deposition rate.

Another characteristic common to conventional vapor phase production of Group III–V compounds is the use of a horizontally positioned reaction chamber wherein the reactant gases pass through the chamber horizontally and parallel to the surface of the substrate, which is located in a decreasing temperature gradient zone. Thus, the initial reactions usually take place between the reactants in a high temperature portion of the reaction vessel and the reactants flow horizontally through a decreasing temperature gradient where the Group III–V compound is formed and deposited on the surface of the substrate.

Several limitations are inherent in the horizontal reactor. For example, the reactant flow stream is horizontal and parallel to the surface of the substrate, and uniform temperature control over the length of the reactor is difficult to maintain. Consequently, a plurality of substrate wafers disposed horizontally within the deposition zone are likely to be at different temperatures or even have a temperature gradient along the length of the wafer, thus resulting in non-uniform deposits.

A further limitation in the prior art method and apparatus for vapor phase production of compound semiconductor material is the mixing of the Group V element and its carrier gas with the halogen gas used to transport the Group III element into the reaction zone. Since Group III elements characteristically have low vapor pressures, they are normally transported into the reaction zone as a high temperature stable monochloride. This transport in the case of gallium is usually accomplished by the following reaction:

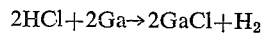

Gallium monochloride is unstable below about 900° C., thus as the temperature is lowered, the monochloride disproportionates according to the reaction

Since the Group V element containing gas is mixed with the HCl prior to the reaction of HCl with the Group III element to form the high temperature stable chloride thereof, the Group V element is available to react with and retard the transport of the Group III element. This interference with the transport reactions is a major limitation in the efficiency of the transport reactions, consequently reaction and deposition rates of the Group III–V product are substantially reduced.

It is therefore an object of this invention to provide a method of producing thick uniform deposits of epitaxially formed Group III–V compounds. Another object is to provide a method of rapidly producing such semiconductor material. A further object is to provide a method of making vapor phase grown Group III–V compound semiconductor materials which avoids the production of excessive amounts of hydrochloric acid.

In accordance with this invention, epitaxial deposits of Group III–V compound semiconductor materials are formed in a vapor phase reaction involving the thermal decomposition product of a volatile hydride of a Group V element with the disproportionation product of an unstable halide of the Group III element. The high temperature stable halide disproportionates to the element and a low temperature stable halide upon passing through a decreasing temperature gradient. The free Group III and Group V elements then react to form a deposit of the compound semiconductor material at the surface of the substrate.

The reaction is preferably carried out in a vertical reactor wherein reactants are allowed to flow downwardly and normal to the surface of the substrate upon which the deposit is to be formed. The vertically disposed reactor is particularly advantageous in allowing close control over temperature gradients within the reactor and in allowing reactants to flow downwardly to impinge normal to the surface of the substrate on which the epitaxial deposit is to be formed. Another advantage of the invention is the use of the decomposition of the volatile hydride instead of the halide of the Group V element, thus reducing the undesired by-product HCl of the reaction by approximately 50%.

Figure 2:
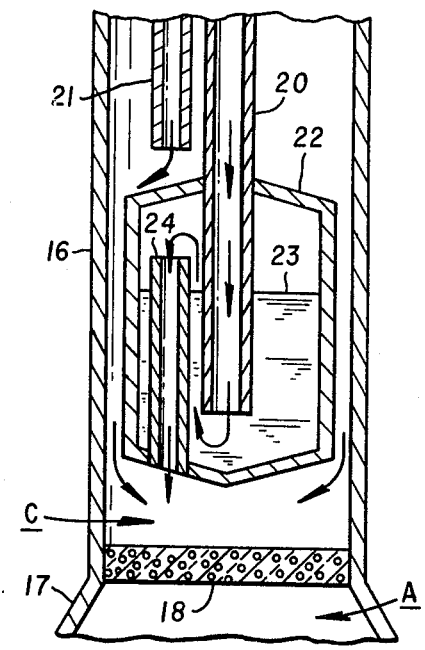

Other objects, features and advantages will become more readily understood from the following detailed description taken in conjunction with the appended claims and attached drawing, in which:

FIGURE 1 is an elevational view in section of the vertical epitaxial reaction described, and FIGURE 2 is an enlarged elevational view in section of the central portion of the reactor of FIGURE 1.

The vertical reactor of FIGURE 1 comprises a cylindrical body 10 having two fitted end caps 11 and 12. End cap 11 has a hollow cylindrical portion 13 which extends upwardly into the central portion of the tubular reactor 10. The cylindrical portion 13 extending into the reactor has a flat surface 14 upon which the substrate material 15 may be positioned. End cap 11 is also fitted with an exhaust outlet 27.

End cap 12 is mounted at the top of the cylindrical body 10 and carries reaction tube 16 formed therein which extends into the central portion of the cylindrical reaction vessel 10. Reaction tube 16 has a flared portion 17 at its lower end which extends over the upwardly recessed cylindrical portion 13 of the bottom end cap 11, thus enclosing substrate wafer 15 within the lower end of the reaction tube 16. The flared portion 17 of the reaction tube 16 extends down over the substrate carrier surface 14 of end cap 11 and acts as a guide to direct gases passing over the substrate wafer 15 downwardly between the walls of the flared portion 17 and the upwardly extending recessed portion 13 of end cap 11.

Reaction tube 16 is appropriately fitted wtih one or more porous members 18 such as a quartz frit which is parallel to and spaced approximately 1 to 3 centimeters above the surface of the substrate wafer 15. The frit member 18 divides the reaction tube 16 into an upper and lower portion; the lower portion being defined by the flared guide 17, the frit material 18 and the flat substrate carrier surface 14. This portion of the reaction tube is identified in FIGURES 1 and 2 by the general reference character A, and is hereinafter referred to as the deposition chamber.

End cap 12 and the reaction tube 16 formed therein, effectively divide the vertical reactor into essentially three separate chambers, the deposition chamber A, previously described, a flush chamber (defined by the walls of the reaction tube 16 and the cylindrical vessel 10), identified in FIGURE 1 by the general reference character B, and a mixing chamber (defined by the upper portion of the reaction tube 16 and the frit member 18), identified by the general reference character C in FIGURE 1.

Reaction tube 16 is appropriately fitted with a cap 19 which carries feed tubes 20 and 21 extending therethrough and down into the central portion of the reactor to a point above the frit member 18. A feed bubbler 22 is secured at the lower end of feed tube 20 and contains the Group III constituent. It will be noted that since the bubbler is positioned within the reactor, which is heated as hereinafter described, the Group III constituent will be in liquid form. Feed tube 20 extends into the bubbler to a point near the bottom thereof so that gas entering the bubbler through the tube 20 will bubble through the liquid 23, the Group III constituent, and react therewith to form a volatile halide as it rises to the surface. Bubbler 22 is fitted with an outlet tube 24 which exhausts gases passing therethrough into the mixing chamber, i.e., the space between the bottom of bubbler 22 and the upper surface of the frit member 18. Tube 24 extends from the opening at its lower end to a point above the surface of liquid 23.

As depicted by the arrows in FIGURE 2, gas in feed tube 20 enters the bubbler near the bottom thereof and bubbles back to the surface of the liquid 23 contained therein. The gas fed through feed tube 20 is a halogen gas, for example HCl, which reacts with the liquid Group III element in the bubbler to form a high temperature stable monohalide of the Group III element. Typical of this type reaction are the transport reactions of gallium with HCl.

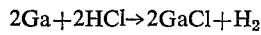

$$2Ga+2HCl \rightarrow 2GaCl+H_2$$

The gaseous products pass out of the bubbler 22 by flowing downwardly through exit tube 24 to exit at the bottom of the bubbler at a point which is near the frit member 18. The GaCl is stable only above about 900° C. Thus by maintaining the mixing chamber C and the frit 18 above this temperature, all the gallium in the mixing chamber C is in the monochloride form.

The Group V constituent is fed into mixing chamber C through feed tube 21. The Group V feed gas exits from tube 21 at a point above the frit member 18.

It will be noted that in the embodiment shown and described, the Group V feed gas and the Group III constituent are kept separate until both gases are combined near the frit member 18 deep within the mixing chamber C. Furthermore, the gas containing the Group V element does not interfere with the Group III transport reaction since the gases are mixed when the Group III element is in the high temperature stable monohalide form. It is important, therefore, that the opening in outlet tube 24 be sufficiently small and the flow of gases therethrough sufficiently high to keep the Group V element carrier gas from entering the bubbler and interfering with the above-described transport reaction. Thus the reactants are not combined until after the monohalide transport reaction is complete.

Cap 19 is further provided with an inlet 25 through which a diluent gas such as hydrogen may be added directly into the mixing chamber C. The diluent gas is used to controllably dilute the reactant gas which is fed through feed tube 21 and to provide a carrier medium which aids the flow of reactants downwardly through the reaction tube 16 and through frit 18.

End cap 12 is also fitted with a flush inlet 26 through which a flush gas may be passed through the outer chamber B. The flush gas entering inlet 26 passes through flush chamber B between the walls of the cylinder 10 and the reaction tube 16 and downwardly over guide 17 to exit through exhaust 27 provided in the lower end cap 11. The flush gas is primarily used to prevent contamination of the deposition chamber A by backdrafts passing upwardly between the guide 17 and the walls of the recessed portion of end cap 11.

Heating coils 28 are appropriately disposed around the outside of cylinder 10 to controllably maintain the desired temperatures within the reactor. Heating coils 28 may be either RF induction heaters or resistance heaters or any other suitable heating means for controllably maintaining the desired temperatures within the reaction chamber C and deposition chamber A. The heating coils are preferably individually controlled so that the temperature of the mixing chamber C and the deposition chamber A may be separately and individual controlled.

The mixing chamber C is maintained at a temperature at which the Group III element monohalide formed in the bubbler is stable. By maintaining the mixing chamber at this temperature, the Group III monohalide is thoroughly mixed with the other reactant gases without reacting therewith. The Group V hydride fed through inlet 21 is decomposed in the mixing chamber into the Group V element and free hydrogen, but the free Group V element cannot react with the Group III element since the Group III element is in the stable monohalide form. The gases are further mixed by being forced through the frit member 18; thus, when the reactants enter the deposition chamber C they are thoroughly mixed but essentially unreacted.

The temperature of the deposition chamber A is controllably maintained to permit disproportionation of the Group III monohalide and reaction of the Group III and Group V elements. Since the reaction between free gallium and free arsenide in the vapor phase occurs at any temperature between about 200° C. and 820° C., and since the GaCl is stable above about 900° C., no deposition will occur in the mixing chamber C. However, by establishing a steep temperature gradient in the deposition chamber A, the monohalide disproportionates and the free gallium and free arsenic react to form GaAs. Furthermore, since the reactants are thoroughly mixed by passing through the frit, the temperature of the deposition chamber may decrease rapidly with distance down from the frit. This steep gradient, or compressed thermal profile, results in the disproportionation and recombination reactions taking place within a short distance of the surface of the substrate 15, thus resulting in highly efficient depositions at very high rates.

For the production of an epitaxial deposit of gallium arsenide upon a gallium arsenide substrate in accordance with the invention, one or more gallium arsenide wafers 15 are suitably prepared and positioned on the flat surface 14 of end cap 11. End cap 11 is fitted onto the cylinder 10 and end cap 12 and cap 19 are appropriately fitted on the upper end of the reaction cylinder to form a substantially gas tight reactor. Bubbler 24 is filled with liquid gallium, and purified helium is flushed through inlets 20, 21, 25 and flush inlet 26 to purge atmospheric gases from the reactor. Helium is then flushed from the reactor by purging with hydrogen.

When the reactor has been sufficiently purged, the flow of hydrogen through feed tube 20 is stopped while the flow of hydrogen through feed tube 21, dilution tube 25 and flush tube 26 is maintained at a rate of approximately 35 cc./minute each. Mixing chamber C and deposition chamber A are then rapidly brought to operating temperature. Purified HCl gas is then admitted through feed tube 20 and allowed to bubble through the liquid gallium 23 in bubbler 22. Arsine ($AsH_3$) or a mixture of $AsH_3$ and hydrogen is admitted through feed tube 21 into mixing chamber C simultaneously therewith.

The HCl bubbling through the liquid gallium at about 1000° C. forms gallium monochloride, which is forced through tube 24 and into mixing chamber C near the frit member 18 where it becomes mixed with $AsH_3$ entering mixing chamber C through feed tube 21 and hydrogen entering mixing chamber C through dilution inlet 25. Accordingly, gallium monochloride, arsenic and hydrogen are first contacted in the mixing chamber C adjacent the surface of the frit member at a temperature above the disproportionation temperature of gallium monochloride. The reactant gases are then forced downwardly through the frit member 18 and are further mixed and evenly dispersed over the cross-sectional area of the reactor as they proceed downwardly into the deposition chamber A.

The temperature of the substrate 15 is maintained at a lower temperature than the mixing chamber C and frit 18. Thus the mixed reactants pass downwardly through a decreasing temperature gradient.

As the reactants pass through the decreasing temperature gradient, the gallium monochloride disproportionates and the free gallium reacts with the free arsenic to form gallium arsenide which deposits as an epitaxial layer on the surface of the gallium arsenide substrate wafer 15. The spent gases pass downwardly between the guide 17 and the recessed portion of end cap 11 to exit through exhaust outlet 27.

It should be noted that the reactants are thoroughly mixed upon entering the deposition chamber A. Thus when the GaCl disproprotionates, free arsenic is available to react with the released gallium without further mixing. The GaCl disproportionates according to the reaction

$$3GaCl \rightarrow GaCl_3 + 2Ga$$

at any temperature below about 900° C. Free gallium and free arsenic react to form GaAs in the vapor phase at any temperature between about 820° C. and 200° C. Consequently, since the reactants are thoroughly mixed upon entering the deposition chamber, the reaction between free gallium and free arsenic will be very efficient and will occur very rapidly. By maintaining the substrate very near the first 18 and at a temperature below about 820° C. (thus effecting a steep or compressed temperature profile) essentially all of the available free gallium and free arsenic react and GaAs deposits on the substrate surface. Accordingly, the deposition is highly efficient and results in very rapid deposition rates.

Although operation of the vertical reactor has been described with reference to the vapor phase formation of gallium arsenide, it is to be understood that other Group III–V compound semiconductor materials such as indium arsenide, indium phosphide, gallium phosphide and others may also be produced, in accordance with the principles of this invention, by selection of the appropriate reactants, flow rates and temperatures. Accordingly, the examples given hereinafter are to be taken as exemplary of the preferred embodiment of the invention.

*Example I*

A monocrystalline wafer of gallium arsenide 20 mils thick was lapped and polished and positioned on the substrate holder 14 of the vertical reactor described with reference to FIGURES 1 and 2. The bubbler 22 was filled with purified gallium and the reactor assembled and sealed as described above.

Purified helium was flushed through the reactor via inlets 20, 21, 25 and 26 and hydrogen thereafter flushed through the system to purge the helium. After displacement of the helium, the hydrogen flow through feed tube 21 was stopped and the temperature of the mixing chamber C and the bubbler 22 contained therein was rapidly brought to a temperature of 1000° C. A decreasing temperature gradient was established in the deposition chamber A so that the temperature therein decreased from 1000° C. at the bottom surface of the first 18 to a temperature of about 850° C. at the surface of the substrate wafer 15. The distance from the bottom of the frit to the wafer 15 was about 2 cm.

The flow of hydrogen through the dilution inlet 25 and the flush inlet 26 was set at a rate of about 35 cc./minute each and a flow of 300 cc./minute of a gas comprising hydrogen and about 0.77% $AsH_3$ was admitted through feed tube 21. Simultaneously therewith a gaseous mixture comprising about 60% anhydrous HCl and about 40% pure hydrogen was admitted through feed tube 20 at a rate of about 95 cu./minute. This mixture was allowed to bubble through the liquid gallium in bubbler 22 to form gallium monochloride which was forced through exit tube 24 into the mixture chamber C. In the mixing chamber C the gallium chloride was mixed with the hydrogen and arsine admitted through feed tube 21 and dilution tube 25. The reactant gases were then forced downwardly through a quartz frit member 18 into the deposition chamber A.

Reactant gases streaming over the surface of the gallium arsenide wafer at 850° C. etched the gallium arsenide surface leaving a clean, undamaged surface. The temperature of the substrate 15 was then gradually lowered to a temperature of about 780° C. At this temperature the reactant gases formed an epitaxial layer of monocrystalline N-type gallium arsenide on the surface of the gallium arsenide substrate 15 at a rate of about 2 microns per minute. In normal operation these conditions are maintained until the desired epitaxial layer thickness is obtained.

To stop the reactor, the HCl flow through feed tube 20 is stopped and hydrogen flushed therethrough. Thereafter, the arsine flow through feed tube 21 is stopped and hydrogen flushed therethrough. When the reactant gases have been purged from the reactor with hydrogen, the system is cooled to room temperature with hydrogen passing therethrough. The hydrogen is then purged from the system with helium and the substrate 15 removed from the reactor.

*Example II*

The process of Example I was repeated substituting a mixture of 1% phosphine ($Ph_3$) in hydrogen for the mixture of 0.77% arsine ($AsH_3$) used in Example I. Other conditions were maintained as set forth in Example I. In epitaxial layer of gallium phosphide was deposited on the surface of the gallium arsenic substrate at a rate of about 2 microns/minute.

The Group III–V compound semiconductor epitaxial deposits formed as described in Examples I and II were found to be of extremely high quality, free of dislocations and lattice strains. Epitaxial deposits of gallium arsenide up to any desired thickness may be deposited in very short time with extremely high reproducibility.

Although the invention has been described above with specific reference to gallium arsenide and gallium phosphide, it will be readily understood that the principles of the invention are equally applicable to other compound semiconductor materials which may be formed by the reaction of a volatile hydride of one constituent such as $AsH_3$, $PH_3$ and $SbH_3$ with the disproportionation product of a halide of the other constituent such as the monohalides of aluminum, gallium, and indium. Furthermore, the principles of the invention may also be utilized to produce mixed composition compound semiconductors. By a mixed composition is meant a compound in which more than one element from a particular group in the Periodic Table are compounded with one or more elements from another group in the Periodic Table while maintaining stoichiometry with respect to periodic group. For example, a mixed composition compound semiconductor compounded from Groups III and V may be represented by the general formula $$A_a B_b C_c D_d E_e F_f$$

where A, B and C represent elements from Group III; D, E and F represent elements from Group V; and where
$a+b+c=1$, and
$d+e+f=1$
where each lower case subscript represents the number of atoms of the immediately preceding element present in a single molecule of the material represented by the general formula.

In accordance with the invention, mixed composition compounds of the general formula $AB_x E_{(1-x)}$ may be formed by the simultaneous vapor phase reaction of hydrides of the elements D and E with the disproportionation product of the halide of element A in the apparatus heretofore described.

A typical example of such mixed composition compound semiconductor material is the Group III–V compound $GaAs_x P_{(1-x)}$. It will be understood that the expression $GaAs_x P_{(1-x)}$ is used herein to describe a compound wherein gallium is combined with arsenic and phosphorous, the number of atoms of gallium being equal to the number of atoms of arsenic and phosphorous combined. Thus, since Group III elements combine with Group V elements in a ratio of 1 to 1, the subscript $x$ in the above expression is used to denote the fractional number of atoms of arsenic which is present in a single molecule of $GaAs_x P_{(1-x)}$.

For example, substitution of a mixture of arsine and phosphine with hydrogen for the mixture of arsine and hydrogen described in Example I above, will result in the production of an epitaxial deposit of $GaAs_x P_{(1-x)}$ wherein $x$ is directly related to the ratio of arsine to phosphine in the reactant feed gas admitted to the reactor through feed tube 21. It will be further noted that by the appropriate variation of the concentrations of each of the Group V hydrides in the gas mixture admitted through feed tube 21, the composition of the resultant product can be varied during the production thereof, thus permitting either abrupt or gradual change in the composition from pure gallium arsenide to pure gallium phosphide or vice versa. Accordingly, the following examples are to be taken as exemplary of the preferred mode of operation.

*Example III*

A monocrystalline wafer of gallium arsenide 20 mils thick was lapped and polished and positioned on the substrate holder 14 of the vertical reactor described with reference to FIGURES 1 and 2. The bubbler 22 was filled with high purity gallium and the reactor assembled and sealed as described above.

Purified helium was flushed through the reactor through inlets 20, 21, 25 and 26 and hydrogen thereafter flushed through the system to purge the helium. After displacement of the helium the hydrogen flow through inlet tube 21 was stopped and the temperature of the mixing chamber C and the bubbler 22 contained therein was rapidly brought to a temperature of 1010° C. A decreasing temperature gradient was established in the reactor so that the temperature therein decreased from 1010° C. at the bottom of frit 18 to a temperature of about 840° C. at the surface of the substrate wafer 15. The flow of hydrogen through the dilution inlet 25 and the flush inlet 26 was set at rates of 40 cc./minute and 35 cc./minute respectively, and a flow of 250 cc./minute of a gas comprising hydrogen and about 2% arsine ($AsH_3$) was admitted through feed tube 21. Simultaneously therewith a gaseous mixture comprising about 1% phosphine ($PH_3$) in hydrogen was also admitted through feed tube 21 at a rate of about 30 cc./minute. Pure anhydrous HCl was allowed to bubble through the liquid gallium in bubbler 22 at a rate of 70 cc./minute to form gallium monochloride which was forced through exit tube 24 into the mixing chamber C. In mixing chamber C the gallium chloride became mixed with the hydrogen, arsine and phosphine admitted through feed tubes 21 and dilution tubes 25. The reactant gases were then forced downwardly through the quartz frit member 18 into the deposition chamber A. Reactant gases streaming over the surface of the gallium arsenide wafer at 840° C. etched the gallium arsenide surface leaving a clean, undamaged surface. The temperature of the substrate 15 was then gradually lowered to about 790° C. At this temperature the reactant gases formed a monocrystalline epitaxial layer of $GaAs_{0.15}P_{0.85}$ on the surface of the gallium arsenide substrate 15 at a rate of about 2 microns/minute.

*Example IV*

The process of Example III was repeated substituting a flow of 170 cc./minute of 1% $PH_3$ in hydrogen and a flow of 130 cc./minute of 2% $AsH_3$ in hydrogen for the flow rates used in Example III. The hydrogen dilution flow rate was reduced from 40 to 35 cc./minute. Other conditions were maintained as set forth in Example III. An epitaxial layer of monocrystalline $GaAs_{0.5}P_{0.5}$ was deposited on the surface of the gallium arsenide substrate at a rate of about 2 microns/minute.

*Example V*

The process of Example IV was repeated substituting a flow of 90 cc./minute of 1% $PH_3$ in hydrogen and a flow of 170 cc./minute of 2% $AsH_3$ in hydrogen for the flow rates used in Example IV. Other conditions were maintained as set forth in Example IV. An epitaxial monocrystalline deposit of $GaAs_{0.81}P_{0.19}$ was deposited on the surface of the gallium arsenide substrate at a rate of about 2 microns/minute.

*Example VI*

The process of Example V was repeated, however no $PCl_3$ was admitted initially. Thus the initial conditions were 170 cc./minute of 2% $AsH_3$ and 0 cc./minute $PH_3$. Other conditions were maintained as set forth in Example V. During the deposition, the flow rate of 2% $AsH_3$ in hydrogen was gradually reduced from 170 cc./minute to 0 cc./minute and, simultaneously therewith, the flow rate of 1% $PH_3$ in hydrogen was increased from 0 cc./minute to 170 cc./minute. A monocrystalline deposit was epitaxially formed on the substrate at a rate of about 2 microns/minute. The epitaxial layer formed, however, varied in composition from GaAs at the surface of the substrate to pure GaP at the surface of the layer. The material of the epitaxial layer was $GaAs_x P_{(1-x)}$ with the value of $x$ decreasing from 1 to 0 with distance from the original surface of the substrate.

The mixed composition epitaxial layers formed in the above examples were found to be of high crystalline perfection, substantially free of lattice strains and of low dislocation density. In each example the layer formed an extension of the crystalline lattice of the substrate wafer.

It will be understood that the principles of the invention are equally applicable to the vapor phase production of compounds of the general type $A_yB_{(1-y)}D$ and quarternary compounds of the type $A_yB_{(1-y)}D_xE_{(1-x)}$. For example, $In_yGa_{(1-y)}As$ may be produced by simply substituting two bubbles, one containing gallium and the other containing indium, for the single bubbler shown in FIGURES 1 and 2. Likewise, $In_yGa_{1-y}As_xP_{(1-x)}$ may be produced by the addition of the appropriate reactants in the apparatus described.

Thus it will therefore be understood that the principles applicable to the operation of apparatus of FIGURES 1 and 2 are equally applicable to the production of Group III–V compounds and mixed composition Group III–V compounds.

Although particular reference has been made to the Group III–V compound gallium arsenide and gallium phosphide, and the mixed composition compounds $GaAs_xP_{(1-x)}$, it will be appreciated that the principles of this invention are applicable to the production of binary compounds of the Group III elements; aluminum, gallium and indium, with any of the Group V elements; phosphorous, arsenic and antimony, and to the production of ternary and quarternary mixed composition compounds of these Group III and Group V elements.

Although specific reference has been made to methods and apparatus for making Group III–V compounds and mixed composition Group III–V compounds, it will be understood that these terms include both doped and undoped semiconductor materials. Dopants may be added as desired in any of the above-described processes by conventional methods such as by including dopants in the Group III source, in the Group V gas stream, or by injection into either the mixing chamber or the deposition chamber in pure element or compound form.

It is to be understood that the above-described methods and apparatus are merely illustrative of the application of principles of the invention. Numerous other arrangements may be devised by those skilled in the art without departing from the spirit and scope of the invention as defined by the appended claims.

What is claimed is:

1. The method of producing Group III–V compound semiconductor material comprising the steps of:
   (a) mixing a Group V element hydride with a vaporized Group III halide in a first chamber at a first temperature, and
   (b) passing the gaseous mixture through a frit and into a second chamber at a second temperature.

2. The method of claim 1 wherein said Group V element hydride is $AsH_3$ and said Group III halide is a chloride of gallium.

3. The method of claim 1 wherein said Group V element hydride is a mixture of $PH_3$ and $AsH_3$.

4. The method of producing a crystalline deposit of a Group III–V compound semiconductor material comprising the steps of:
   (a) providing a reaction vessel having at least a first chamber and a second chamber separated by a porous member;
   (b) heating said first chamber and said porous member to about 1000° C.;
   (c) heating said second chamber to about 800° C.;
   (d) mixing a Group V hydride and a Group III halide in said first chamber; and
   (e) passing the resultant mixture through said porous member into said second chamber.

5. The method of claim 4 wherein said Group V hydride is selected from the group consisting of $AsH_3$, $PH_3$ and $SbH_3$.

6. The method of claim 5 wherein said Group III halide is selected from the group consisting of halides of aluminum, gallium and indium.

7. The method of making a Group III–V mixed composition compound semiconductor material comprising the steps of:
   (a) mixing hydrides of a plurality of Group V elements with a halide of Group III element selected from the group consisting of aluminum, gallium, and indium in first a chamber at a first temperature; and
   (b) passing the mixture through a porous frit and intoa second chamber at a temperature which is lower than said first temperature.

8. The method of making a Group III–V mixed composition compound semiconductor material comprising the steps of:
   (a) mixing a hydride of a Group V element selected from the group conssiting of phosphorous, arsenic, and antimony with halides of a plurality of Group III elements in a first chamber at a first temperature; and
   (b) passing the mixture through a porous frit and into a second chamber at a temperature which is lower than said first temperature.

9. The method of making a mixed composition Group III–V compound, wherein the mixed composition compound has the formula

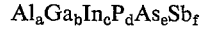

$$Al_aGa_bIn_cP_dAs_eSb_f$$

wherein each of $a$, $b$, $c$, $d$, $e$, and $f$ range from zero to one and $a+b+c=1$ and $d+e+f=1$, comprising the steps of:
   (a) providing a vertically disposed reaction tube having a frit therein which divides said reaction tube into an upper and a lower chamber;
   (b) providing a substrate in said lower chamber;
   (c) heating said upper chamber and said frit to a temperature greater than about 900° C.;
   (d) heating said substrate in said lower chamber to a temperature of about 200° C. to about 820° C.;
   (e) introducing a gas comprising hydrogen and a hydride of Group V elements selected from the group consisting of arsenic, phosphorous, antimony and combinations thereof into said upper chamber;
   (f) introducing a volatile halide of Group III elements selected from the group consisting of aluminum, gallium, indium and combinations thereof which are substantially stable at temperatures greater than about 900° C. into said upper chamber;
   (g) mixing said halide and said hydride in said upper chamber and by forcing the mixture through said frit, and
   (h) passing said mixture over said substrate, thereby forming crystalline deposit of mixed composition Group III–V compound material on said substrate.

References Cited

UNITED STATES PATENTS

| | | | |
|---|---|---|---|
| 3,218,205 | 11/1965 | Ruehrwein | 148—175 |
| 3,224,913 | 12/1965 | Ruehrwein | 252—62.3 XR |
| 3,338,761 | 8/1967 | Cheney et al. | 23—204 XR |

HYLAND BIZOT, *Primary Examiner.*

P. WEINSTEIN, *Assistant Examiner.*